US011585293B2

(12) United States Patent
Suciu (10) Patent No.: US 11,585,293 B2
(45) Date of Patent: Feb. 21, 2023

(54) LOW WEIGHT LARGE FAN GAS TURBINE ENGINE

(71) Applicant: United Technologies Corporation, Hartford, CT (US)

(72) Inventor: Gabriel L. Suciu, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 602 days.

(21) Appl. No.: 14/428,049

(22) PCT Filed: Feb. 10, 2013

(86) PCT No.: PCT/US2013/025470
§ 371 (c)(1),
(2) Date: Mar. 13, 2015

(87) PCT Pub. No.: WO2014/055102
PCT Pub. Date: Apr. 10, 2014

(65) Prior Publication Data
US 2015/0252752 A1 Sep. 10, 2015

Related U.S. Application Data

(60) Provisional application No. 61/708,288, filed on Oct. 1, 2012.

(51) Int. Cl.
*F02K 3/04* (2006.01)
*F01D 17/10* (2006.01)
(Continued)

(52) U.S. Cl.
CPC .............. *F02K 3/04* (2013.01); *F01D 17/105* (2013.01); *F02C 3/107* (2013.01); *F02C 7/20* (2013.01);
(Continued)

(58) Field of Classification Search
CPC ...... F02K 3/06; F02C 7/36; F02C 3/04; F02C 3/13; F01D 15/12; F05B 2260/4023; F05B 2260/40
See application file for complete search history.

(56) References Cited

U.S. PATENT DOCUMENTS 3,287,906 A   11/1966 McCormick
3,747,343 A    7/1973 Rosen
(Continued)

FOREIGN PATENT DOCUMENTS

GB      1516041     6/1978
GB      2041090     9/1980
WO   2007038674     4/2007

OTHER PUBLICATIONS

Rauch, Dale, Design Study of an Air Pump and Integral Lift Engine ALF-504 Using the Lycoming 502 Core, Jul. 1972, NASA.*

(Continued)

*Primary Examiner* — Steven M Sutherland
(74) *Attorney, Agent, or Firm* — Carlson, Gaskey & Olds, P.C.

(57) ABSTRACT

A gas turbine engine includes a fan with a plurality of fan blades rotatable about an axis, a compressor section, a combustor in fluid communication with the compressor section, and a turbine section in fluid communication with the combustor. The fan defines a fan diameter and the turbine section includes a fan drive turbine with a diameter less than 0.50 the size of the fan diameter. A geared architecture is driven by the turbine section for rotating the fan about the axis.

25 Claims, 5 Drawing Sheets (51) Int. Cl.
F04D 29/32 (2006.01)
F02C 3/107 (2006.01)
F02C 7/20 (2006.01)
F02K 3/06 (2006.01)

(52) U.S. Cl.
CPC .............. *F02K 3/06* (2013.01); *F04D 29/325* (2013.01); *F05D 2220/32* (2013.01); *F05D 2230/50* (2013.01); *F05D 2260/4031* (2013.01)

(56) References Cited

U.S. PATENT DOCUMENTS

| | | | |
|---|---|---|---|
| 3,754,484 A | 8/1973 | Roberts | |
| 3,892,358 A | 7/1975 | Gisslen | |
| 4,010,608 A * | 3/1977 | Simmons | F02K 3/075 60/226.3 |
| 4,130,872 A | 12/1978 | Harloff | |
| 4,916,894 A * | 4/1990 | Adamson | F02C 3/107 416/171 |
| 5,169,288 A * | 12/1992 | Gliebe | F02C 7/045 415/119 |
| 5,433,674 A | 7/1995 | Sheridan et al. | |
| 5,447,411 A | 9/1995 | Curley et al. | |
| 5,474,258 A * | 12/1995 | Taylor | B64D 27/26 244/54 |
| 5,524,847 A | 6/1996 | Brodell et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 5,996,336 A | 12/1999 | Hamedani | |
| 6,070,407 A | 6/2000 | Newton | |
| 6,189,830 B1 * | 2/2001 | Schnelz | B64D 27/18 244/54 |
| 6,223,616 B1 | 5/2001 | Sheridan | |
| 6,318,070 B1 | 11/2001 | Rey et al. | |
| 6,371,721 B1 | 4/2002 | Sathianathan et al. | |
| 6,497,550 B2 | 12/2002 | Booth | |
| 6,732,502 B2 | 5/2004 | Seda et al. | |
| 6,814,541 B2 | 11/2004 | Evans et al. | |
| 7,021,042 B2 | 4/2006 | Law | |
| 7,591,754 B2 | 9/2009 | Duong et al. | |
| 7,824,305 B2 | 11/2010 | Duong et al. | |
| 7,926,260 B2 | 4/2011 | Sheridan et al. | |
| 7,955,046 B2 | 7/2011 | McCune et al. | |
| 8,205,432 B2 | 6/2012 | Sheridan | |
| 8,246,292 B1 | 8/2012 | Morin et al. | |
| 8,277,174 B2 | 10/2012 | Hasel et al. | |
| 2008/0267762 A1 * | 10/2008 | Jain | B64D 33/02 415/2.1 |
| 2010/0148396 A1 | 6/2010 | Xie et al. | |
| 2010/0331139 A1 | 12/2010 | McCune | |
| 2012/0198815 A1 | 8/2012 | Suciu et al. | |

OTHER PUBLICATIONS

Daly, Mark Jane's Aero-Engines, Sep. 2010, Issue 28.*
Warwick, Graham, Civil engines: Pratt & Whitney gears up for the future with GTF, Flightglobal.com.*
Gray, D.E., "Energy Efficient Engine Program Technology Benefit/Cost Study vol. II", 1983, United Technologies Corporation Pratt and Whitney Engineering Division (Year: 1983).*
Marsh, George, "Composites get in deep with new-generation engine", Materials Today, Dec. 2006 (Year: 2006).*
PurePower PW1000G engine, The Economic and Environmental Solution, L.A. World Airports, May 13, 2009 (Year: 2009).*
Development in Geared Turbofan Aeroengine, Tobi, A.L. Modh 2016 IOP Conf. Ser. Mater. Sci. Eng. 131 (Year: 2016).*
International Search Report—PCT/US2013/025470, dated Feb. 10, 2013.
NASA Conference Publication. Quiet, powered-lift propulsion. Cleveland, Ohio. Nov. 14-15, 1978.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8), p. 32.
Hendricks, E.S. and Tong, M.T. (2012). Performance and weight estimates for an advanced open rotor engine. NASA/TM-2012-217710.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.
Zalud, T. (1998). Gears put a new spin on turbofan performance. Machine Design, 70(20), p. 104.
International Preliminary Reporton Patentability for International Application No. PCT/US2013/025470 dated Apr. 16, 2015.
Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida.
Agarwal, B.D and Broutman, L.J. (1990). Analysis and performance of fiber composites, 2nd Edition. John Wiley & Sons, Inc. New York: New York.
Carney, K., Pereira, M. Revilock, and Matheny, P. Jet engine fan blade containment using two alternate geometries. 4th European LS-DYNA Users Conference.
Brines, G.L. (1990). The turbofan of tomorrow. Mechanical Engineering: The Journal of the American Society of Mechanical Engineers, 108(8), 65-67.
Faghri, A. (1995). Heat pipe and science technology. Washington, D.C.: Taylor & Francis.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979.
Horikoshi, S. and Serpone, N. (2013). Introduction to nanoparticles. Microwaves in nanoparticle synthesis. Wiley-VCH Verlag GmbH & Co. KGaA.
Kerrebrock, J.L. (1977). Aircraft engines and gas turbines. Cambridge, MA: The MIT Press.
Xie, M. (2008). Intelligent engine systems: Smart case system. NASA/CR-2008-215233.
Knip, Jr., G. (1987). Analysis of an advanced technology subsonic turbofan incorporating revolutionary materials. NASA Technical Memorandum. May 1987.
Willis, W.S. (1979). Quiet clean short-haul experimental engine (QCSEE) final report. NASA/CR-159473.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press.
Ramsden, J.M. (Ed). (1978). The new European airliner. Flight International, 113(3590). Jan. 7, 1978.
Langston, L. and Faghri, A. Heat pipe turbine vane cooling. Prepared for Advanced Turbine Systems Annual Program Review. Morgantown, West Virginia. Oct. 17-19, 1995.

(56) References Cited

OTHER PUBLICATIONS

Oates, G.C. (Ed). (1989). Aircraft propulsion systems and technology and design. Washington, D.C.: American Institute of Aeronautics, Inc.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.

Dickey, T.A. and Dobak, E.R. (1972). The evolution and development status of ALF 502 turbofan engine. National Aerospace Engineering and Manufacturing Meeting. San Diego, California. Oct. 2-5, 1972.

Gunston, B. (Ed.) (2000). Jane's aero-engines, Issue seven. Coulsdon, Surrey, UK: Jane's Information Group Limited.

Ivchenko—Progress D-436. Jane's Aero-engines, Aero-engines—Turbofan. Feb. 8, 2012.

Ivchenko—Progress AI-727M. Jane's Aero-engines, Aero-engines—Turbofan. Nov. 27, 2011.

Ivchenko—Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

Miller, J. A. and O'Connor, J. J.: "Power Shaft," Welding Journal, vol. 59, No. 5, May 1, 1980, pp. 17-22.

Wilfert, G., "Geared Fan," Aero-Engine Design: From State of the Art Turbofans Towards Innovative Architectures—Hardcover, Lecture Series, Mar. 3, 2008, pp. 1-76.

Waters, M.H. and Schairer, E.T. (1977). Analysis of turbofan propulsion system weight and dimensions. NASA Technical Memorandum. Jan. 1977. pp. 1-65.

Daly, M. and Gunston, B. (2010). Aircraft Propulsion. Jane's Aero-Engines. Sep. 2010. Issue Twenty-eight.

Gunston B. (2005). Engine Alliance GP7200. Jane's Aero-Engines. Issue 18, pp. 537-538.

Warwick, G. (2007). Civil engines: Pratt & Whitney gears up for the future with GTF. Nov. 2007.

Moroz, L. and Grebennik, K. (2009). Comparison of Counter-Rotating and Traditional Axial Aircraft Low-Pressure Turbines Integral and Detailed Performances. SoftInWay Inc. Aug. 2009. Antalya, Turkey.

Shovlin, Michael D. "An overview of Quiet Short-haul Research Aircraft Program", NASA-TM-78545, Nov. 30, 1978 (Nov. 30, 1978), XP55466112, Ames Research Center, NASA. http://citeerx.ist.psu.edu/viewdoc/download?doi=10,1,1,692,8036&rep=rep1&type=pdf.

\* cited by examiner

LOW WEIGHT LARGE FAN GAS TURBINE ENGINE

CROSS-REFERENCE TO RELATED APPLICATION

This application claims priority to U.S. Provisional Application Ser. No. 61/708,288, filed Oct. 1, 2012.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the inner shaft. A direct drive gas turbine engine includes a fan section driven by the low spool such that the low pressure compressor, low pressure turbine and fan section rotate at a common speed in a common direction.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Although geared architectures have improved propulsive efficiency, turbine engine manufacturers continue to seek further improvements to engine performance including improvements to thermal, transfer and propulsive efficiencies.

SUMMARY

In a featured embodiment, a gas turbine engine has a propulsor including a fan and a fan drive geared architecture. The fan defines a fan diameter. A gas generator includes a fan drive turbine, which drives the fan through the fan drive geared architecture. The fan drive turbine has a diameter less than 0.50 the size of the fan diameter.

In another embodiment according to the previous embodiment, the diameter of the fan drive turbine is greater than 0.30 the size of the fan diameter.

In another embodiment according to any of the previous embodiments, the diameter of the fan drive turbine is between about 0.35 and about 0.45 the size of the fan diameter.

In another embodiment according to any of the previous embodiments, the fan drive turbine further comprises a high pressure turbine located upstream of the low pressure turbine.

In another embodiment according to any of the previous embodiments, the fan drive turbine comprises a low pressure turbine.

In another embodiment according to any of the previous embodiments, a compressor section has a low pressure compressor driven by the low pressure turbine and a combustor in fluid communication with the compressor section.

In another embodiment according to any of the previous embodiments, a first shaft connects the low pressure turbine, low pressure compressor, and the fan drive geared architecture.

In another embodiment according to any of the previous embodiments, the fan drive geared architecture comprises an epicyclic gear box.

In another embodiment according to any of the previous embodiments, the diameter of the fan drive turbine is defined by an outer case surface of the fan drive turbine.

In another embodiment according to any of the previous embodiments, the fan diameter is defined by an outer peripheral surface of the fan blades.

In another embodiment according to any of the previous embodiments, an engine case surrounds the gas generator. The engine case includes at least one pylon mount interface for attachment to a pylon mounted underneath a wing.

In another featured embodiment, a gas turbine engine has a propulsor including a fan and a fan drive geared architecture. The fan defines a fan diameter. A gas generator includes a fan drive turbine, which drives the fan through the fan drive geared architecture. The fan drive turbine has a diameter between about 0.35 and about 0.45 the size of the fan diameter.

In another embodiment according to the previous embodiment, the fan drive geared architecture has a gear reduction ratio of greater than about 2.3

In another embodiment according to any of the previous embodiments, the fan drive geared architecture comprises an epicyclic gear box.

In another embodiment according to any of the previous embodiments, a compressor section has at least a first compressor and a second compressor, a combustor in fluid communication with the compressor section, and at least one additional turbine. A first shaft connects the fan drive turbine and the first compressor and a second shaft connects the second compressor and the one additional turbine.

In another embodiment according to any of the previous embodiments, the second shaft rotates at a faster speed than the first shaft.

In another embodiment according to any of the previous embodiments, the fan drive turbine comprises a low pressure turbine and the one additional turbine comprises a high pressure turbine.

In another embodiment according to any of the previous embodiments, the fan drive geared architecture couples the first shaft to the fan at a location upstream of the compressor section.

In another embodiment according to any of the previous embodiments, an engine case surrounds the gas generator. The engine case includes at least one pylon mount interface for attachment to a pylon mounted underneath a wing.

In another embodiment according to any of the previous embodiments, the pylon mount interface comprises at least a front mount beam and a rear mount beam located aft of the front mount beam.

BRIEF DESCRIPTION OF THE DRAWINGS

The disclosure can be further understood by reference to the following detailed description when considered in connection with the accompanying drawings wherein.

DETAILED DESCRIPTION

Figure 1:
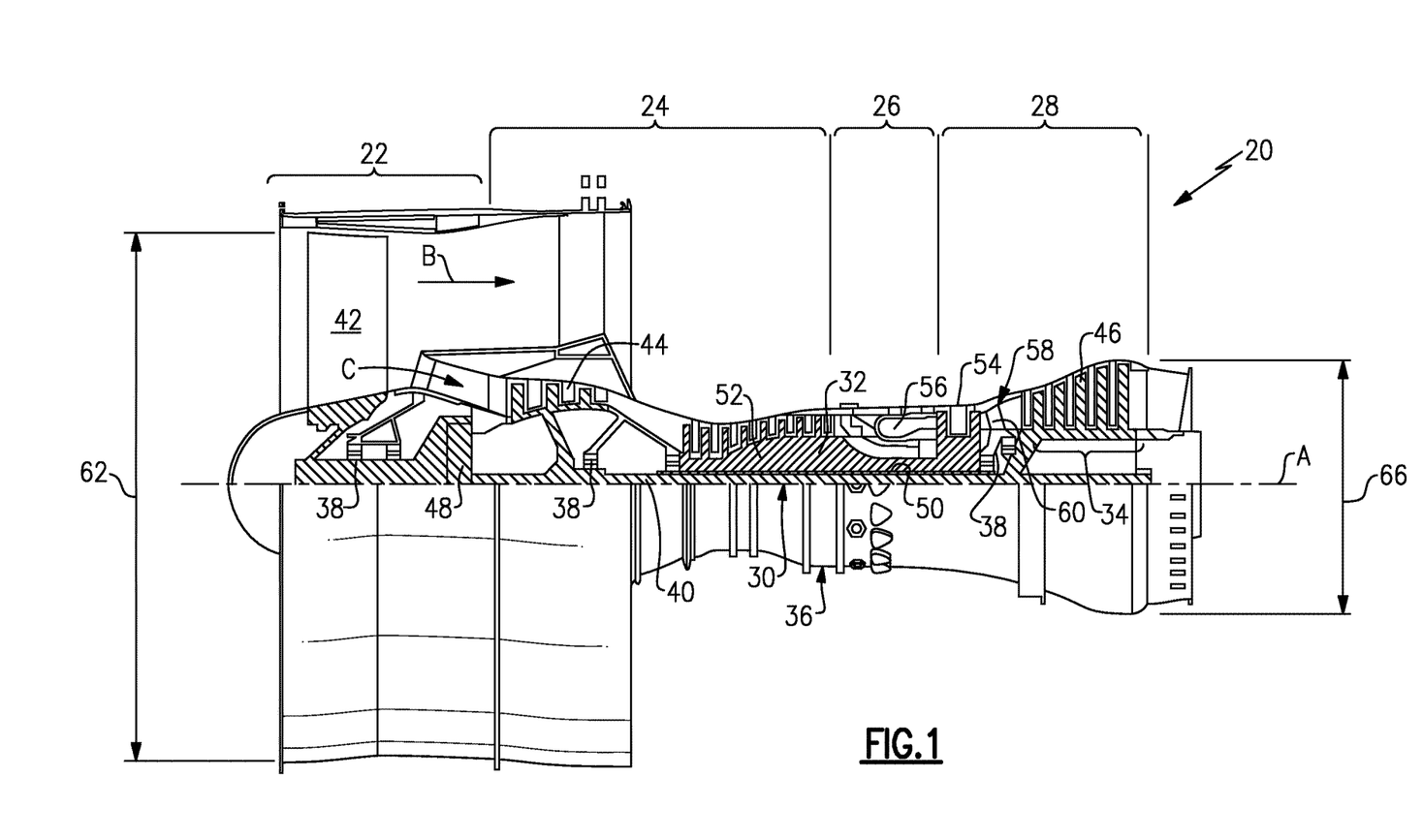
FIG. 1 schematically illustrates a geared turbofan engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFCT')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7\ °R)]^{0.5}$. The "Low corrected fan tip speed", as disclosed herein according to one non-limiting embodiment, is less than about 1150 ft/second.

Figure 5A:
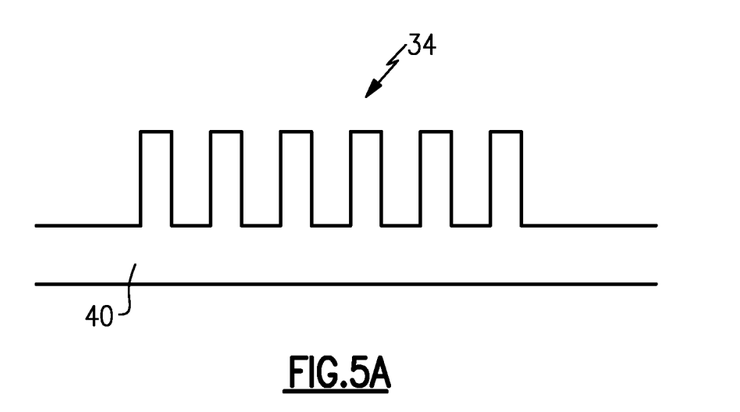
FIG. 5A schematically shows a low pressure turbine with six stages.
Figure 5B:
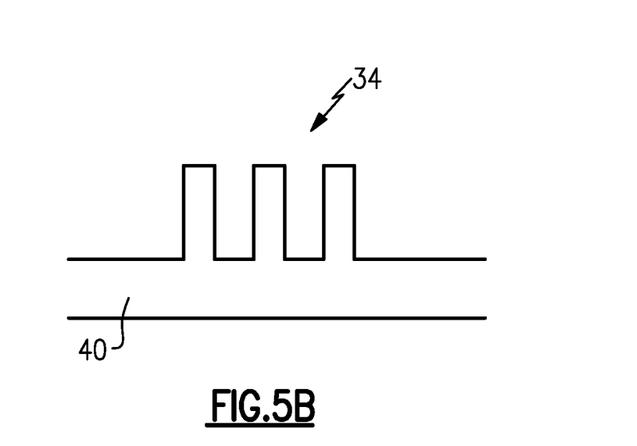
FIG 5B schematically shows a low pressure turbine with three stages.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors (FIG. 5A) schematically indicated at 34. In another non-limiting example embodiment, the low pressure turbine 46 includes about 3 turbine rotors (FIG. 5B). A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
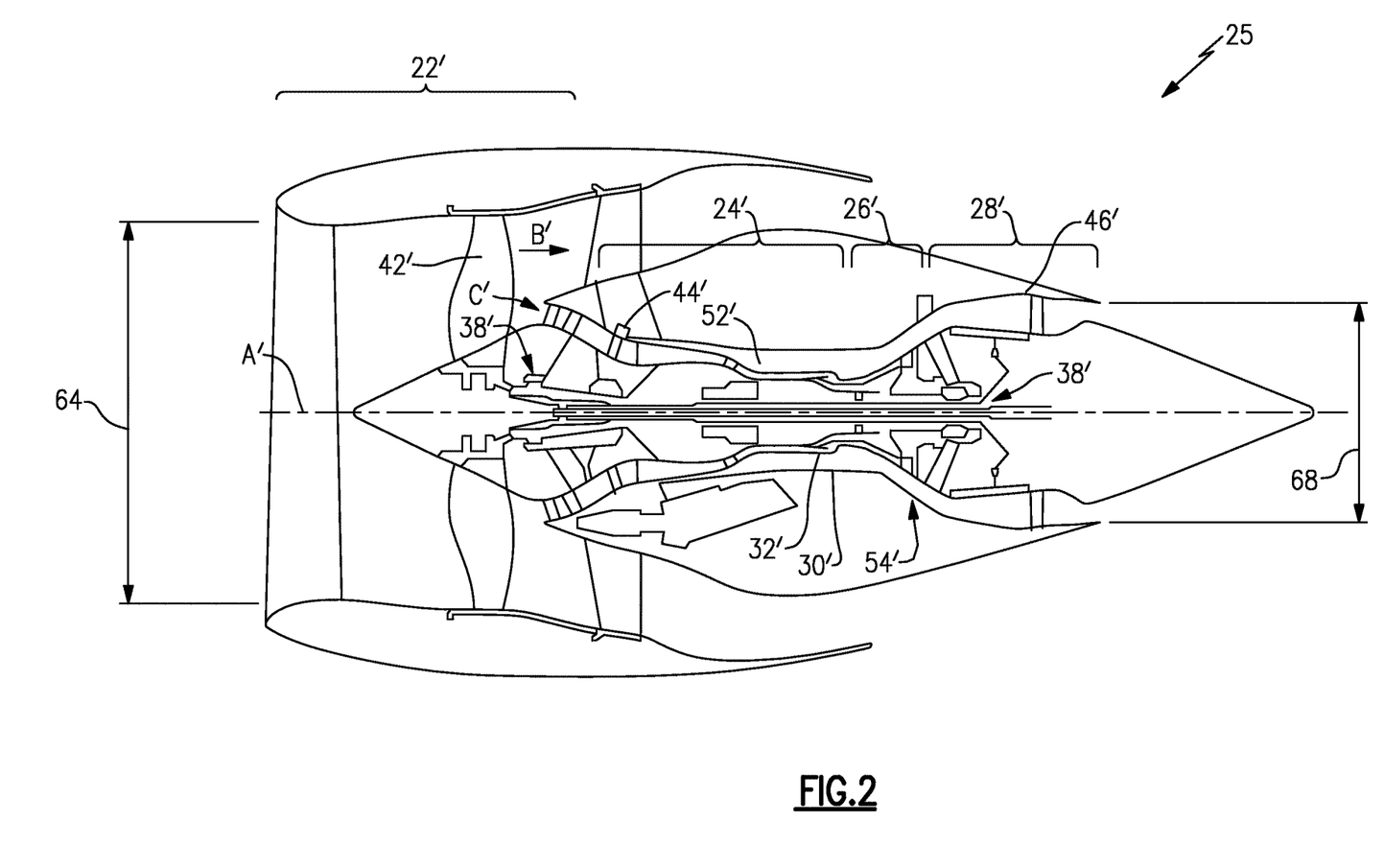
FIG. 2 schematically illustrates a direct drive turbine engine embodiment.

The configuration shown in FIG. 2 is a direct drive turbine engine 25. The direct drive turbine engine 25 includes a fan section 22', a compressor section 24', a combustor section 26', and a turbine section 28'. The fan section 22' drives air along a bypass flow path B' while the compressor section 24' draws air in along a core flow path C' where air is compressed and communicated to the combustor section 26'. In the combustor section 26', air is mixed with fuel and ignited to generate a high pressure exhaust gas stream that expands through the turbine section 28' where energy is extracted and utilized to drive the fan section 22' and the compressor section 24'.

The direct drive turbine engine 25 generally includes a low speed spool 30' and a high speed spool 32' mounted for rotation about an engine central longitudinal axis A' relative to an engine static structure via several bearing systems 38'. The low speed spool 30' generally includes an inner shaft that connects a fan 42' having a plurality of blades and a low pressure (or first) compressor section 44' to a low pressure (or first) turbine section 46'. The inner shaft or low speed spool 30' directly drives the fan 42', that is, the fan 42' and low pressure turbine section 46' are driven at the same speed. The high-speed spool 32' includes an outer shaft that interconnects a high pressure (or second) compressor section 52' and a high pressure (or second) turbine section 54'. The inner shaft and the outer shaft are concentric and rotate via the bearing systems 38' about the engine central longitudinal axis A'.

In the direct drive configuration shown in FIG. 2, a fan drive turbine directly drives the fan section 22', i.e. there is no geared architecture in this configuration. In FIG. 2, the fan drive turbine comprises the low pressure turbine 46' which is coupled to directly drive the fan 42'.

The geared architecture configuration has increased efficiency that enables the use and fabrication of a smaller low pressure turbine 46 both in diameter and in the number or overall stages as compared to the direct drive turbine engine 25 (FIG. 2), which must rotate at a less efficient speed.

Moreover, the smaller, more efficient low pressure turbine 46 of the geared turbofan engine 20 enables alternate and more efficient mounting configurations. Space limitations for wing mounted engines result from a minimum distance between a bottom of an engine and the runway. Larger landing gear components can be utilized to raise the aircraft and thereby the engine relative to the runway, but larger landing gear components are not a desirable option due to significant weight penalties. Accordingly, as the propulsor fan section 22 grows in size, the mounting options decrease. For engines having the same fan section diameter, the fan drive turbine section of the direct drive engine 25 (FIG. 2) is much larger than the fan drive turbine section of a geared turbofan engine 20 (FIG. 1).

This difference becomes significant when defining a mounting configuration for the engine. The core engine section including the fan drive turbine section can be mounted under the wing, with the fan section extending forward of the wing. The larger fan drive turbine section of a direct drive turbine requires that the engine centerline be spaced a further distance from a bottom surface of the wing as compared to a centerline of a geared turbofan engine with the smaller more efficient fan drive turbine. Even modest reductions in this spacing can enable significant weight savings in smaller landing gear lengths and structures.

The example geared turbofan engine 20 includes a fan diameter 62 (FIG. 1) and an example direct drive engine 25 includes a fan diameter 64 (FIG. 2). In one example configuration, both the fan diameter 62 of the geared turbofan engine 20 and the fan diameter 64 of the direct drive turbine engine 25 are of a common size. Further, in this example, the fan pressure ratio and overall pressure ratio through the core are the same. When these fan diameters 62, 64 and pressure ratios are the same, the geared turbofan engine 20 includes a fan drive turbine diameter 66 (FIG. 1) that is much smaller than a diameter 68 (FIG. 2) of the fan drive turbine for the direct drive engine 25. In one example, for a common fan diameter, the fan drive turbine is about 0.35 to about 0.45 the diameter 62 of the fan 42, wherein a corresponding direct drive engine 25 would include a fan drive turbine between about 0.50 and 0.65 the diameter 64 of the fan 42'.

Figure 3:
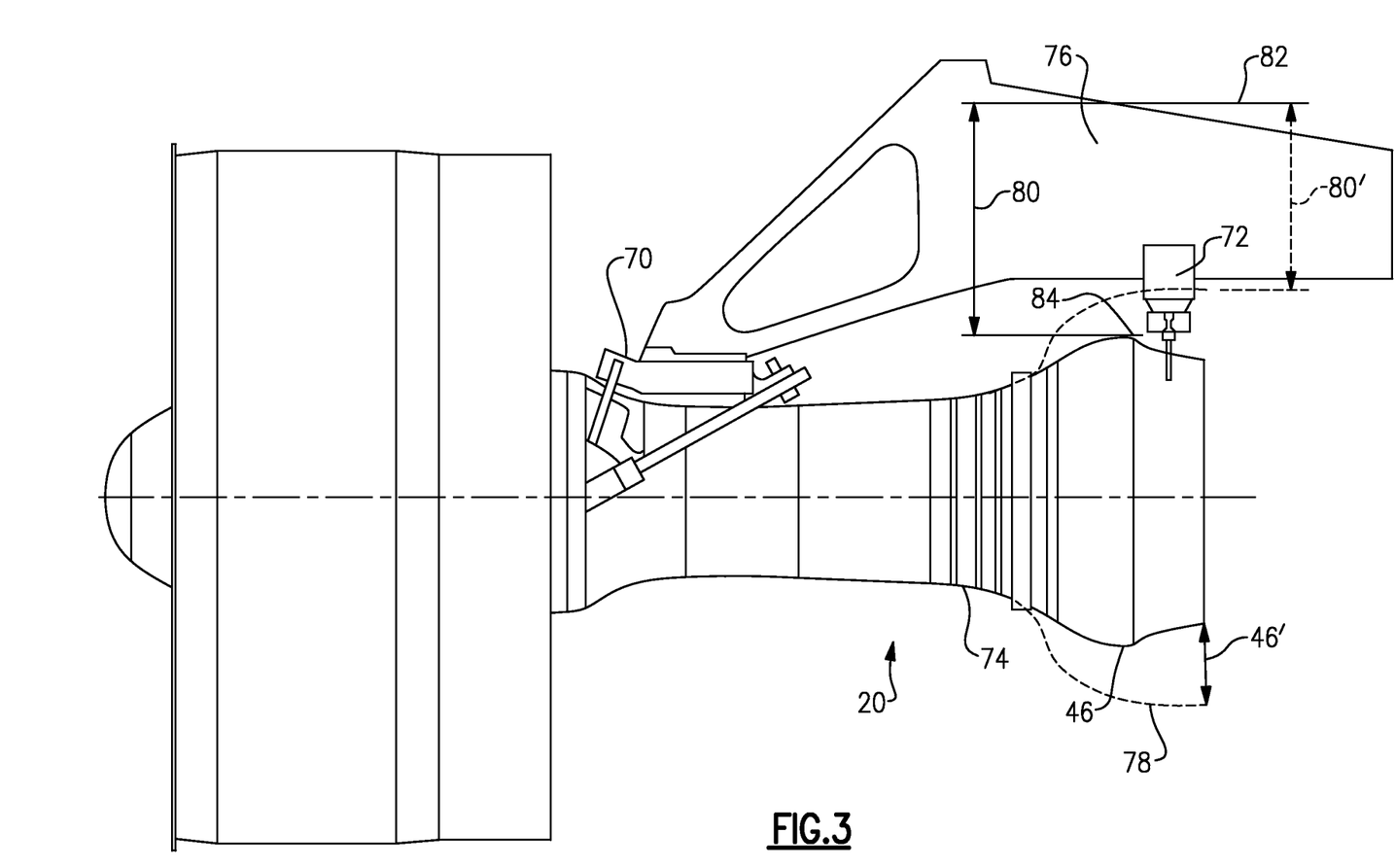
FIG. 3 shows a side view of a geared turbofan embodiment in one example mounting configuration.
Figure 4:
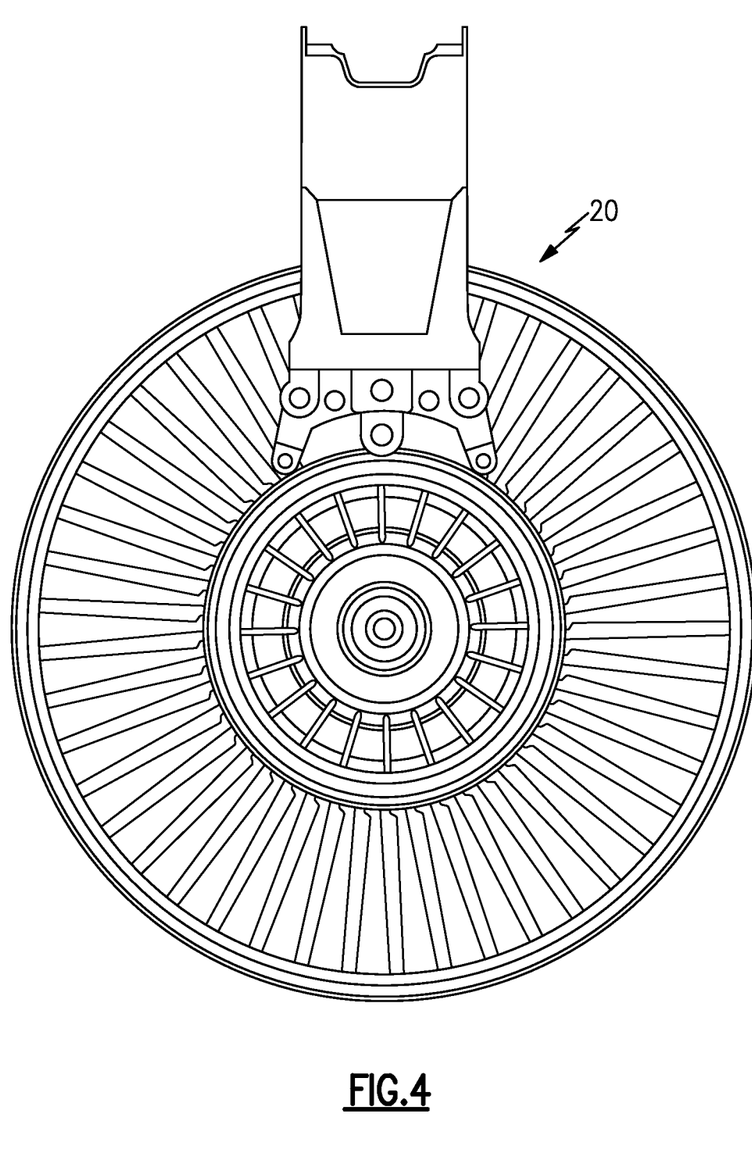
FIG. 4 an end view of FIG. 3 in an aft direction looking forward.

FIGS. 3-4 show the geared turbofan engine 20 in one example mount configuration. A front mount beam 70 and a rear mount beam 72 are used to connect the engine case 74 to a pylon 76 that is mounted underneath a wing. One relatively important dimension, indicated at 80, is the distance between a bottom surface 82 of the wing and an outermost surface 84 of the fan drive turbine section, that is, low pressure turbine 46. For a fan diameter 64 (FIG. 2) that is the same as the fan diameter 62 for the geared turbofan engine 20 in FIGS. 3-4, the fan drive turbine section, that is, low pressure turbine 46', would have a comparatively greater size as indicated by an outermost surface 78 of the low pressure turbine 46'. The increased turbine size for the direct drive configuration decreases the wing clearance dimension 80' when compared to the dimension 80 of the geared turbo fan engine 20.

Thus, the significance of the difference in size of the two different fan drive turbine sections is illustrated with the required spacing of the critical dimension 80' for a direct drive turbine indicated between the outermost surface 78, shown by the dashed lines, and the bottom surface 82 of the wing. Accordingly, the size of the fan 42' for a direct drive turbine engine 25 is limited by the size of the fan drive turbine, i.e. the size of the low pressure turbine 46'. As such, the geared turbofan engine 20 with the smaller more efficient fan drive turbine, i.e. low pressure turbine 46, can provide a larger fan in the same space, and/or enable a fan size not possible in a direct drive gas turbine engine 25.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
   a propulsor including a fan that delivers airflow to a bypass passage and a fan drive geared architecture, the fan defining a fan diameter, and wherein the fan includes a number of fan blades fewer than twenty fan blades, and an outer housing surround the fan blades to establish the bypass passage, and wherein the fan diameter is defined by an outer peripheral surface of the fan blades;

a gas generator that includes a fan drive turbine having a number of turbine rotors that is within a range of three to six turbine rotors, and wherein the fan drive turbine drives the fan through the fan drive geared architecture, the fan drive turbine having a diameter less than 0.50 the size of the fan diameter and wherein the diameter of the fan drive turbine is greater than 0.30 the size of the fan diameter, and wherein the diameter of the fan drive turbine is defined by an outermost outer surface of the fan drive turbine, and wherein the diameter of the outermost outer surface of the fan drive turbine is defined by an outwardly facing surface of an outer case of the fan drive turbine;

a compressor section having a low pressure compressor and a high pressure compressor; and a turbine section connected to the compressor section, the turbine section including the fan drive turbine and a high pressure turbine located upstream of the fan drive turbine, and wherein the low pressure compressor is a three-stage compressor, and the high pressure turbine has at least two stages.

2. The gas turbine engine according to claim 1, wherein the diameter of the fan drive turbine is between 0.35 and 0.45 the size of the fan diameter.

3. The gas turbine engine according to claim 1, wherein the fan drive turbine comprises a low pressure turbine.

4. The gas turbine engine according to claim 3, including a combustor in fluid communication with the compressor section.

5. The gas turbine engine according to claim 4, including a first shaft connecting the low pressure turbine, low pressure compressor, and the fan drive geared architecture.

6. The gas turbine engine according to claim 3, wherein the low pressure turbine has three stages.

7. The gas turbine engine according to claim 3, wherein the low pressure turbine has six stages.

8. The gas turbine engine according to claim 1, wherein the fan drive geared architecture comprises an epicyclic gear box.

9. The gas turbine engine according to claim 1, wherein a ratio between the number of fan blades and the number of turbine rotors is between 3.3 and 8.6.

10. The gas turbine engine according to claim 1, including an engine case surrounding the gas generator, wherein the engine case includes at least one pylon mount interface for attachment to a pylon mounted underneath a wing.

11. The gas turbine engine according to claim 10, wherein the at least one pylon mount interface comprises at least a front mount beam and a rear mount beam located aft of the front mount beam, and wherein a critical dimension is defined by a spacing between the outermost outer surface of the fan drive turbine and a bottom surface of the wing such that the spacing provides a desired amount of clearance for the rear mount beam.

12. A gas turbine engine comprising:

a propulsor including a fan that delivers airflow to a bypass passage and a fan drive geared architecture, the fan defining a fan diameter, and wherein the fan includes a number of fan blades fewer than twenty fan blades, and an outer housing surround the fan blades to establish the bypass passage, and wherein the fan diameter is defined by an outer peripheral surface of the fan blades; and a gas generator that includes a fan drive turbine having a number of turbine rotors that is within a range of three to six turbine rotors, and wherein the fan drive turbine drives the fan through the fan drive geared architecture, the fan drive turbine having a diameter between 0.35 and 0.45 the size of the fan diameter, and wherein the diameter of the fan drive turbine is defined by an outermost outer surface of an outer case of the fan drive turbine, wherein the outermost outer surface of the outer case is an outwardly facing surface of the outer case, and including a compressor section having a low pressure compressor, a combustor in fluid communication with the compressor section, and a turbine section connected to the compressor section, the turbine section including the fan drive turbine and a high pressure turbine located upstream of the fan drive turbine, and wherein the low pressure compressor is a three-stage compressor, and the high pressure turbine has at least two stages.

13. The gas turbine engine according to claim 12, wherein the compressor section has a high pressure compressor, and including a first shaft that connects the fan drive turbine and the low pressure compressor and a second shaft that connects the high pressure compressor and the high pressure turbine.

14. The gas turbine engine according to claim 13, wherein the second shaft rotates at a faster speed than the first shaft.

15. The gas turbine engine according to claim 14, wherein the fan drive turbine comprises a low pressure turbine, and wherein the low pressure turbine has three or six stages.

16. The gas turbine engine according to claim 13, wherein the fan drive geared architecture couples the first shaft to the fan at a location upstream of the compressor section.

17. The gas turbine engine according to claim 12, including an engine case surrounding the gas generator wherein the engine case includes at least one pylon mount interface for attachment to a pylon mounted underneath a wing.

18. The gas turbine engine according to claim 17, wherein the at least one pylon mount interface comprises at least a front mount beam and a rear mount beam located aft of the front mount beam.

19. The gas turbine engine according to claim 18, wherein a critical dimension is defined by a spacing between the outermost outer surface of the fan drive turbine and a bottom surface of the wing such that the spacing provides a desired amount of clearance for the rear mount beam.

20. The gas turbine engine according to claim 12, wherein a ratio between the number of fan blades and the number of turbine rotors is between 3.3 and 8.6.

21. A gas turbine engine comprising:

a propulsor including a fan that delivers airflow to a bypass passage and a fan drive geared architecture, the fan defining a fan diameter, and wherein the fan includes a number of fan blades fewer than twenty fan blades, and an outer housing surround the fan blades to establish the bypass passage, and wherein the fan diameter is defined by an outer peripheral surface of the fan blades;

a gas generator that includes a turbine section including at least a fan drive turbine which drives the fan through the fan drive geared architecture and a high pressure turbine located upstream of the fan drive turbine, and wherein the fan drive turbine has a number of turbine rotors that is within a range of three to six turbine rotors, and the fan drive turbine has a diameter less than 0.50 the size of the fan diameter, and wherein the diameter of the fan drive turbine is defined by an outermost outer surface of the fan drive turbine, and wherein the diameter of the fan drive turbine is defined by the outermost outer surface of an outwardly facing surface of an outer case of the fan drive turbine;

a compressor section having a low pressure compressor and a high pressure compressor, wherein the low pressure compressor is a three-stage compressor, and the high pressure turbine has at least two stages;

an engine case surrounding the gas generator wherein the engine case includes a pylon mount interface configured to be attached to a pylon mounted underneath a wing, and wherein the pylon mount interface comprises at least a front mount beam and a rear mount beam located aft of the front mount beam; and a critical dimension at the pylon mount interface that is defined by a spacing between the outermost outer surface of the fan drive turbine and a bottom surface of the wing such that the spacing provides a desired amount of clearance for the pylon mount interface.

22. The gas turbine engine according to claim 21, wherein the fan drive turbine has a diameter between 0.35 and 0.45 the size of the fan diameter.

23. The gas turbine engine according to claim 21, and wherein a ratio between the number of fan blades and the number of turbine rotors is between 3.3 and 8.6.

24. The gas turbine engine according to claim 21, wherein the fan drive turbine has three turbine rotors.

25. The gas turbine engine according to claim 21, wherein the fan drive turbine has six turbine rotors.

\* \* \* \* \*